United States Patent
Gordon et al.

(10) Patent No.: US 12,282,323 B2
(45) Date of Patent: Apr. 22, 2025

(54) VACUUM SYSTEM WITH DIAGNOSTIC CIRCUITRY AND A METHOD AND COMPUTER PROGRAM FOR MONITORING THE HEALTH OF SUCH A VACUUM SYSTEM

(71) Applicant: Edwards Vacuum LLC, Sanborn, NY (US)

(72) Inventors: Derrick Gordon, Chelmsford, MA (US); Rajesh Melkote, Chelmsford, MA (US); Andrew Ellis Longley, Chelmsford, MA (US); John Peter Nordquist, Chelmsford, MA (US)

(73) Assignee: Edwards Vacuum LLC, Sanborn, NY (US)

( * ) Notice: Subject to any disclaimer, the term of this patent is extended or adjusted under 35 U.S.C. 154(b) by 570 days.

(21) Appl. No.: 17/625,231

(22) PCT Filed: Jul. 7, 2020

(86) PCT No.: PCT/IB2020/056366
§ 371 (c)(1),
(2) Date: Jan. 6, 2022

(87) PCT Pub. No.: WO2021/005502
PCT Pub. Date: Jan. 14, 2021

(65) Prior Publication Data
US 2022/0269257 A1 Aug. 25, 2022

(30) Foreign Application Priority Data
Jul. 8, 2019 (GB) .................................. 1909762

(51) Int. Cl.
*G05B 23/02* (2006.01)
*A47L 9/28* (2006.01)
*F04B 37/08* (2006.01)

(52) U.S. Cl.
CPC ........ *G05B 23/0237* (2013.01); *A47L 9/2852* (2013.01); *A47L 9/2889* (2013.01); *F04B 37/08* (2013.01); *G05B 23/024* (2013.01)

(58) Field of Classification Search
CPC . G05B 23/0237; G05B 23/024; A47L 9/2852; A47L 9/2889; F04B 37/08
See application file for complete search history.

(56) References Cited

U.S. PATENT DOCUMENTS 7,016,751 B2    3/2006  Nordquist et al.
8,336,318 B2   12/2012  Koyama
(Continued)

FOREIGN PATENT DOCUMENTS

CN    101080700 A    11/2007
CN    103225594 A     7/2013
(Continued)

OTHER PUBLICATIONS

Japanese Notice of Reasons for Refusal dated Feb. 20, 2024 for corresponding Japanese Application No. JP2022-500536, 17 pages.
(Continued)

*Primary Examiner* — Mi'schita' Henson
(74) *Attorney, Agent, or Firm* — Theodore M. Magee; Westman, Champlin & Koehler, P.A.

(57) ABSTRACT

A vacuum system includes at least one cryopump; sensors associated with the cryopump, each of the sensors being configured to sense an operating condition of the cryopump; and diagnostic circuitry configured to receive signals sampled from the sensors. The diagnostic circuitry includes a diagnostic model of the cryopump, the diagnostic model being derived from historical data of a plurality of cryopumps of a same type operating over a plurality of regeneration and servicing time periods and being configured to relate values of the sampled signals from the at least (Continued)

some sensors to a probability of the pump failing within a predetermined time. The diagnostic circuitry is configured to apply the sampled signals to the diagnostic model and to determine the probability of the at least one cryopump failing within a predetermined time from an output of the model.

15 Claims, 7 Drawing Sheets

(56) References Cited

U.S. PATENT DOCUMENTS

| | | |
|---|---|---|
| 2001/0012485 A1 | 8/2001 | Gaudet et al. |
| 2008/0109185 A1 | 5/2008 | Cheung et al. |
| 2012/0317999 A1 | 12/2012 | Koyama |
| 2013/0268241 A1 | 10/2013 | Das et al. |
| 2016/0153806 A1 | 6/2016 | Ciasulli et al. |
| 2016/0245270 A1 | 8/2016 | Yatsu |
| 2024/0266867 A1* | 8/2024 | Munson .................. G06N 3/045 |

FOREIGN PATENT DOCUMENTS

| | | |
|---|---|---|
| CN | 107429685 A | 12/2017 |
| JP | 2000097814 A | 4/2000 |
| JP | 2000249057 A | 9/2000 |
| JP | 2005009337 A | 1/2005 |
| JP | 2008274865 A | 11/2008 |
| JP | 2018500709 A | 1/2018 |
| JP | 2018193933 A | 12/2018 |
| TW | I491802 B | 7/2015 |
| WO | WO-02093277 A1 * | 11/2002 ........... G05B 19/058 |

OTHER PUBLICATIONS

PCT International Search Report dated Sep. 29, 2020 for corresponding PCT application Serial No. PCT/IB2020/056366, 4 pages.

PCT Written Opinion dated Sep. 29, 2020 for corresponding PCT application Serial No. PCT/IB2020/056366, 8 pages.

British Examination Report dated Jan. 7, 2020 and Search Report dated Jan. 6, 2020 for corresponding British application Serial No. GB1909762.5, 6 pages.

Taiwanese Office Action dated Sep. 5, 2023 and Search Report dated Sep. 1, 2023 for corresponding Taiwanese Application No. TW109123078, 20 pages.

First Chinese Office Action dated Sep. 26, 2023 and Search Report dated Sep. 18, 2023 for corresponding Chinese Application No. CN202080049715.X, 30 pages.

Israeli Office Action dated Jan. 5, 2025 for corresponding Israeli application Serial No. 289605, 4 pages.

* cited by examiner

VACUUM SYSTEM WITH DIAGNOSTIC CIRCUITRY AND A METHOD AND COMPUTER PROGRAM FOR MONITORING THE HEALTH OF SUCH A VACUUM SYSTEM

CROSS-REFERENCE TO RELATED APPLICATION

This application is a Section 371 National Stage Application of International Application No. PCT/IB2020/056366, filed Jul. 7, 2020, and published as WO 2021/005502 A1 on Jan. 14, 2021, the content of which is hereby incorporated by reference in its entirety and which claims priority of British application Serial No. GB1909762.5, filed Jul. 8, 2019. The entire teachings of the above application are incorporated herein by reference.

FIELD

The field of the invention relates to vacuum systems containing cryopumps and diagnostic apparatus and methods for predicting time of failure of such pumps.

BACKGROUND

Cryopumps work on the principle of condensing or trapping the gases to be pumped. This means that the cryopump needs to be periodically regenerated to remove the trapped gas. Regeneration involves isolating the pump from the vacuum system and warming the pump up while introducing purge gases to desorb or sublime the trapped gas. This step takes the pump out of service and therefore the end user tries to schedule the regeneration step during planned, periodic preventive maintenance (PM).

During a scheduled PM, the regeneration itself (which can take up to 4 hours from start to finish) is a planned event which the end user accounts for in the overall system preparation. If however, a regeneration or maintenance has to be performed unexpectedly and therefore occurs outside of the scheduled PM, this represents an unscheduled downtime for the vacuum system. This can have a negative impact on the end user and in particular, on the capacity, yield and/or productivity of the vacuum system.

An unscheduled regeneration may be triggered in response to signal(s) indicating that the cryopump is not performing to their expectations. Typically, these signals are based on 1st and 2nd stage temperatures (referred to as T1 and T2 respectively). End users set control limits, especially on T2, and use statistical process control (or equivalent) to determine whether an upward or unstable trend is real, and to take action (or not). The issue is that relying on T1 and T2 alone to detect a pump that is starting to degrade in its performance, leaves inadequate lead time before action has to be taken—such as an unscheduled regeneration, or worse yet, an unscheduled complete swap of the pump, and replacement with a spare.

It would be desirable to provide a diagnostic system able to better predict future failures of a pump and thereby reduce the occurrence of unscheduled maintenance requirements.

The discussion above is merely provided for general background information and is not intended to be used as an aid in determining the scope of the claimed subject matter. The claimed subject matter is not limited to implementations that solve any or all disadvantages noted in the background.

SUMMARY

A first aspect provides a vacuum system, comprising: at least one cryopump; a plurality of sensors associated with said at least one cryopump each of said plurality of sensors being configured to sense an operating condition of said at least one cryopump; diagnostic circuitry configured to receive signals sampled from at least some of said plurality of sensors, said diagnostic circuitry comprising a diagnostic model of said cryopump, said diagnostic model being derived from historical data of a plurality of cryopumps of a same type operating over a plurality of regeneration and servicing time periods and being configured to relate values of said sampled signals from said at least some sensors to a probability of said pump failing within a predetermined time, said diagnostic circuitry being configured to apply said sampled signals to said diagnostic model and to determine said probability of said at least one cryopump failing within a predetermined time from an output of said model.

The inventors of the present invention recognised that by associating several sensors with a cryopump, signals indicative of the operation of the pump can be sampled. These provide a detailed indication of the current health of the cryopump and how it is changing. Embodiments analyse this information to predict when the pump may fail and to schedule maintenance accordingly. Although collecting additional signals from a pump may provide additional information relevant to the pump's current health, the drawback is that the more signals there are the more difficult it is for a service engineer to analyse them effectively and to derive relevant information therefrom. The inventors of the present invention recognised that not only were many of the sensed signals relevant, but that were data from many machines of the same type to be collected, then a model could be built that accurately linked the values of the different signals sampled at different times and how they changed in value over time, with the probability of failure. Such a model could take account of many different signals and provide an effective way of predicting failure. Furthermore, as new data was collected such a model could be updated over time using the same machine learning techniques that were used to develop the original model.

In effect such a diagnostic solution would be able to provide more advanced and more accurate notice of a degradation in pump performance than is possible today, thereby giving the end user a chance to take action at the next scheduled PM, rather than incurring costly unscheduled downtime.

While this solution can be of general utility across currently used cryopumps, it may be particularly useful for the next generation of cryopump systems and in particular the ion implant use case where the cryopump life is predicted to be shorter as is the interval between PMs.

It should be noted that the predicted failure of a pump is the time that it is assessed that the pump's performance would drop below a given threshold, or would stop operating completely if some maintenance or perhaps a regeneration were not performed. This, it can be used as an estimated time for an engineer to intervene by swapping or servicing the pump in some way.

The sensors associated with the cryopump may be configured to sample a number of operational conditions of the cryopump, each of these operational conditions being indicative of a current health of the vacuum pump and their value and/or change in value over time providing an indication of potential failure of the pump. By inputting at least some of these signals into a diagnostic model an accurate probability of pump failure can be derived.

In some embodiments, said vacuum system comprises a plurality of cryopumps, said diagnostic circuitry being configured to receive signals from each of said plurality of cryopumps and to determine a probability of each of said cryopumps failing.

Although the vacuum system may contain just one cryopump, in many cases there are a plurality of cryopumps within a vacuum system, such as in a system for evacuating a semiconductor processing chamber, and scheduling the replacement and maintenance of these cryopumps is important for the productivity and yield of the system. Thus, providing accurate predictions of their failures such that any maintenance and/or replacement of pumps can be done during scheduled maintenance periods is advantageous.

In some embodiments, said diagnostic circuitry is responsive to detecting a probability of said at least one cryopump failing being above a predetermined threshold value for a set time to output a warning indicating said pump should be replaced at a next scheduled preventive maintenance.

As noted previously, the prediction of failure of a pump can be used to replace or repair the pump during a scheduled maintenance period. In embodiments, the system determines where the probability of the cryopump failing rises above a predetermined probability threshold for a set time and takes this as an indication that the pump should be changed at the next preventive maintenance period.

In this regard, the diagnostic model is set to determine the probability of the cryopump failing within a predetermined time, this predetermined time being selected to be the time period between preventive maintenance events or in some cases a shorter time period than this. Where it is selected to be the time period between preventive maintenance, then when a warning signal has been received the pump should be changed at the next preventive maintenance period as otherwise there is a high probability that it will fail before the next period. If however the prediction of failure is a prediction of failure within say 30 days and the maintenance schedule is for 45 days, which time period is typical for the ion implant case for example, then were this warning to occur towards the end of the operating period, say in the $40^{th}$ day it may be that the pump can last to the next preventive maintenance schedule.

In some embodiments, said vacuum pump system comprises an input for receiving signals from a remote diagnostic system and an output for outputting signals to said remote diagnostic system.

Although, the vacuum system and diagnostic circuitry may be used as a stand-alone unit, in some embodiments it is used in conjunction with a remote in some cases a cloud based diagnostic system and receives signals from this system and outputs signals to it.

In some embodiments, said vacuum system is configured to periodically output data collected from at least some of said sensors along with data indicative of maintenance performed on said at least one cryopump to said cloud based diagnostic system.

The remote diagnostic system can be used to maintain the diagnostic model to ensure that its accuracy is continually improved and relevant to the pump(s) operation. Thus, data indicative of the pump(s) operation and their failing can be uploaded to the system and used in improving the model.

In some embodiment, said vacuum system comprises an input for receiving data from a service engineer indicative of a condition of a pump that is replaced during said maintenance period, said vacuum system being configured to output said data indicative of said condition of said replaced pump as part of said periodically output data.

In order to improve the model still further additional data from a service engineer may be uploaded to the cloud based diagnostic system. In this regard, data that is particularly relevant to the prediction of a pump failing is not just whether a pump was replaced in response to a determined probability indicating it should be replaced, but also the condition of the pump at this time. Without this additional information there is a danger that the model will only be seen to fail where a pump is changed too late, and thus, the model will tend to predict a shorter maintenance period than is required. By including data from a service engineer indicative of the condition of the pump when changed, this additional information can be used to determine whether or not the pump really needed to be changed at this moment and to adjust the maintenance period in the data base used in generating the diagnostic model if, for example, it is determined that it might have lasted until a subsequent period. Furthermore, in some cases data indicative of a reason for the pump failing such as contamination may be output to the diagnostic model and this can be used for improving the vacuum system as a whole.

In some embodiments, said vacuum system comprises an input configured to periodically receive updates to said diagnostic model.

As noted previously, it may be advantageous to continually update the diagnostic model as it is improved and having an input for receiving such a model allows this to happen.

In some embodiments, said vacuum system comprises an input configured to periodically receive said updates to said diagnostic model from said cloud based diagnostic system.

Although, the model can be updated manually by a service engineer, in some cases it is updated by receiving a signal directly from the cloud based diagnostic system. In this way, the cloud based diagnostic system can automatically update the model as it determines from received data that the model can be improved.

A second aspect provides a method of monitoring a vacuum system, said vacuum system comprising at least one cryopump, said method comprising: sampling a plurality of signals indicative of operating conditions of said at least one cryopump from sensors associated with said cryopump: inputting at least some of said signals to a diagnostic model of said cryopump, said diagnostic model being derived from historical data of a plurality of cryopumps of a same type operating over a plurality of time periods, at least some of which include at least one of regeneration, servicing and failure of said pump, said diagnostic model relating signals to a probability of said pump failing; determining from an output of said model a probability of said at least one cryopump failing.

A third aspect provides computer program comprising machine readable instructions which when executed by a computer are operable to control said computer to perform a method according to a second aspect of the invention.

A fourth aspect of the present invention provides a method of generating a diagnostic model for a type of cryopump, said method comprising: inputting into a machine learning algorithm data collected from sensing operating conditions of a plurality of cryopumps of said type from a database storing said sensed operating conditions of said plurality of cryopumps sampled over a plurality of time periods at least some of time periods including at least one of regeneration, servicing and failure, to generate a plurality of probabilities of said pumps failing within a certain time; comparing said probabilities for respective pumps with pump failure timings for said pumps retrieved from said database and updating parameters within said machine learning algorithm to reduce a difference between said determined probabilities and said pump failure timings; and repeating said steps until said difference reaches one of a minimum or a predetermined value; and generating said diagnostic model from said algorithm and parameters that provided said difference.

The diagnostic model that is used for diagnosing the vacuum system of embodiments can be generated using machine learning algorithms that have access to a database containing sensed operating conditions of a plurality of pumps connected over an operational time period which includes a time period during which they are operational, during which they are regenerated and during which at least some them fail. The machine learning algorithm is configured to generate probabilities of the failure of the pumps from the sensed and sampled operating conditions and these probabilities are then compared with actual pump failure timings taken from the database and the machine learning algorithm is then updated until the probabilities and the actual pump failure timings more closely match each other. When a suitable match has been found, which might be where the predicted failures when compared to the actual failures are deemed to give a certain desired accuracy or where a minimum difference between the vales has been found then a diagnostic model is generated from that algorithm.

In some embodiments, prior to inputting the data into the machine learning algorithms that data is filtered to remove outlying data. In this regard, sensed signals may have noise associated with them so that they are not accurate and not representative of the true operating condition of the pump and/or, a pump may have a fault which makes it run at a particularly low or high temperature, such that signals from that pump are unrepresentative of other pump operations.

In some embodiments, prior to inputting said received signals into said machine learning algorithm said signals are filtered to remove signals sampled a predetermined time before and after a regeneration of said cryopumps.

Filtering of the signals may also be done to remove signals that may not be outliers but that are known not to be representative of the normal operation of the pump. For example, signals sampled a predetermined time before and after a regeneration of the cryopumps may not be indicative of normal operation.

A fifth aspect provides a method for updating said diagnostic model generated according to the fourth aspect, the method comprising receiving a further plurality of signals indicative of operating conditions of a plurality of cryopumps of a same type; receiving pump maintenance and failure timings for said plurality of cryopumps; adding said received data to database and performing said method of any the fourth aspect to generate an updated diagnostic model; and outputting said updated diagnostic model.

Having generated a diagnostic model this diagnostic model will then be used to diagnose cryopumps of this type to predict failures of the cryopump such that they can be replaced on time. Use of this model involves the sampling of data indicative of operating conditions of the cryopumps and of their failure and thus, in some cases, this data is collected and uploaded back to the central diagnostic model generating means and used to periodically update the model. As the model is generated using a machine learning algorithm from collected data, the same method of generating the model can be used to update it simply by including the additional data in the database that was originally used to generate the model. In this regard, the additional data may be added to the original database or it may replace some of the older data in the database.

In some embodiments, the method further comprises receiving data indicative of a condition of a pump replaced following said diagnostic model indicating said pump would fail within a predetermined time, said data being input to said machine learning algorithm during said updating of said diagnostic model Where a service engineer inputs data indicative of a condition of a pump following failure then this information can be useful in improving the model. Thus, it may be included in the data input to the machine learning algorithm. In this regard, the machine learning algorithm can be adapted to accommodate this data or the time of failure may be amended in the database from that of the replacement of the pump to that that the condition of the pump predicts the pump would have failed at where this is different.

A sixth aspect provides a computer program comprising machine readable instructions which when executed by a computer is operable to control said computer to perform a method according to a fourth or fifth aspect.

A seventh aspect provides a remote diagnostic module comprising a computer configured to execute said computer program according to a sixth aspect.

An eighth aspect provides a system comprising a vacuum system according to a first aspect and said remote diagnostic module according to a seventh aspect, said remote diagnostic system being configured to receive signals output by said vacuum system and to update said database of cryopump operations with said received signals and to generate an updated diagnostic module by inputting data from said updated database to said machine learning algorithm.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

The summary is provided to introduce a selection of concepts in a simplified form that are further described in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention will now be described further, with reference to the accompanying drawings, in which.

DETAILED DESCRIPTION

Before discussing the embodiments in any more detail, first an overview will be provided.

Embodiments seek to provide a system that is able to predict the failure and thus, the required maintenance or regeneration of a cryopump. Such pumps require periodic regeneration/maintenance and are typically scheduled to be swapped out of a vacuum system such as a processing chamber every 45 to 60 days. If the requirement for maintenance could be predicted accurately and far enough ahead then these could be aligned with the scheduled maintenance periods and unscheduled maintenance periods could be reduced or even eliminated.

Embodiments, provide a diagnostic system that receives inputs from sensors associated with the cryopumps and enter them into a model that models the operation of the cryopump and predicts future failures from the values and/or changes in values of the received signals. The model is generated from an analysis of historic data collected from sensors associated with a plurality of the same type of cryopumps operating over a time period which includes at least some scheduled maintenance periods. The model may be periodically updated using machine learning techniques by analysing newly received data from cryopumps being diagnosed by the system.

In this way a continually improving diagnostic system is produced that uses collected data from currently operating cryopumps.

Embodiments provide a combination of batch and real-time information that provides: a quantitative probability of "failure" within an upcoming specified interval (desirably greater than the PM interval) for a system of pumps, on a specific tool or across multiple tools. This can provide invaluable guidance to the end user or the customer service engineer (CSE), which can be used to make decisions on when to swap pumps and avoid unscheduled regenerations.

Figure 1:
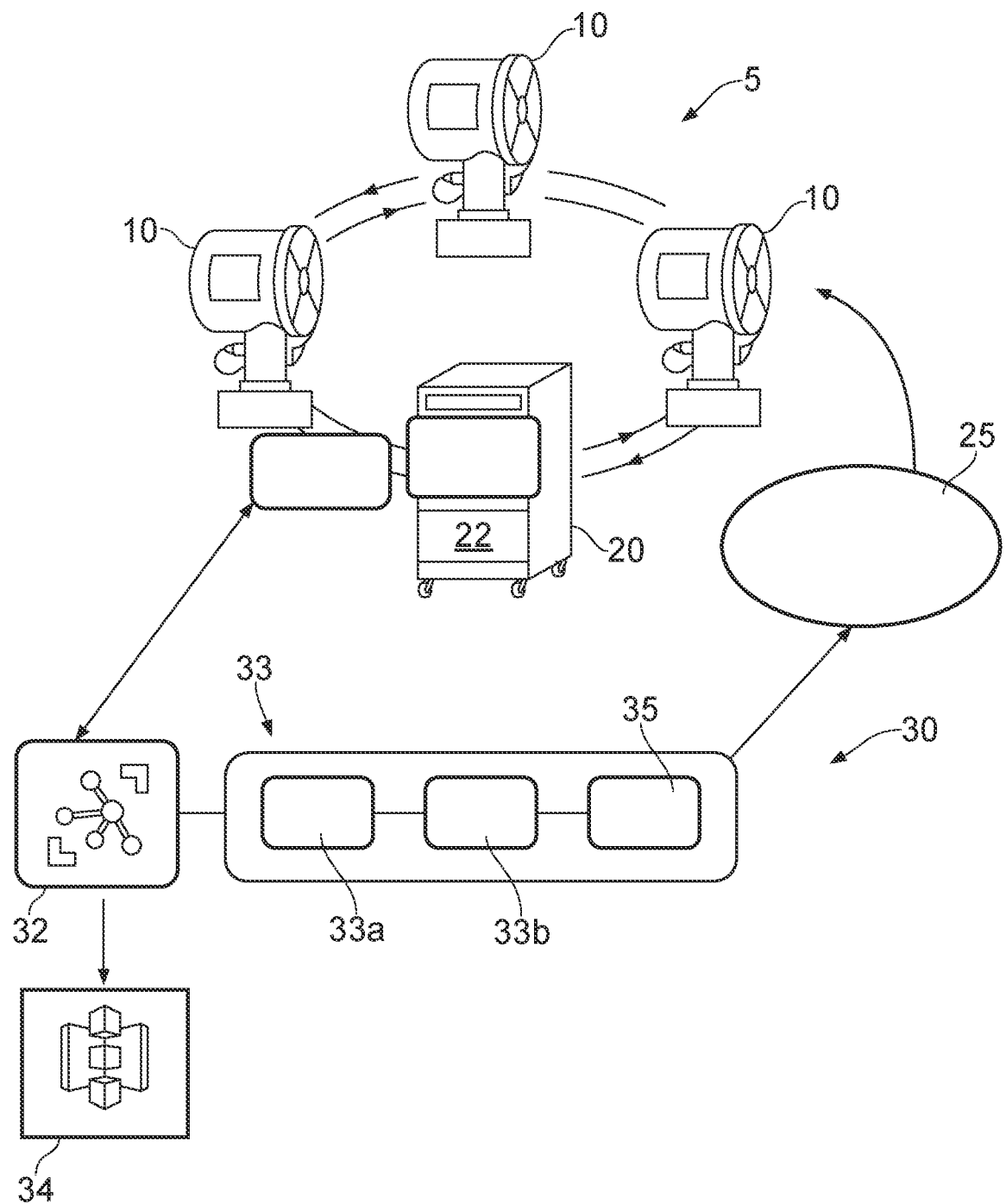
FIG. 1 schematically illustrates a vacuum system according to an embodiment.

FIG. 1 shows a vacuum system according to an embodiment. In this vacuum system 5 there are three cryopumps 10 which are controlled by a supervisor node 20. The supervisor node 20 contains diagnostic circuitry shown schematically as 22, which circuitry contains logic comprising a diagnostic model for predicting failure of the vacuum pumps.

During operation sensors (not shown) associated with the vacuum pumps 10 sense operating conditions of the pumps and send signals indicative of these operating conditions to the supervisor node 20. Diagnostic circuitry 22 within the supervisor node 20 samples at least some of the signals and inputs the sampled signals as input data to the diagnostic model. These operating conditions may include the temperature of the first stage of the vacuum pump, the temperature of the second stage of the vacuum pump, the time taken to reach a desired temperature in each of the vacuum pump stages, the speed of the vacuum pump motor and other variables illustrative of the operation of the vacuum pump 10.

In some embodiments, the vacuum pump is a two stage cryopump having a first stage array and a radiation shield both coupled to the first stage of a refrigerator and a second stage array coupled to the second stage of the refrigerator. Such cryopumps have temperature sensors associated with the first stage and the second stage arrays to monitor their temperatures. During regeneration of the cryopump, the cryopump is heated so that condensed gases are liberated. There are heaters, which may comprise electric heater circuitry for heating the arrays during this procedure. The inputs to the diagnostic system may include the temperature readings of the temperature sensors associated with the arrays, the inputs to the heaters, such as the current supplied to the heater circuitry, and the speed of the motor.

At least some of these signals are input to the diagnostic model which predicts a probability of failure for each of the pumps from variations and values of these signals. In this regard, in this embodiment the diagnostic model determines when it expects the probability of failure of one of the pumps within a predetermined time period. This predetermined time period may for example be 45 days, which may be the time between scheduled maintenance events. It may alternatively, be a shorter time than the time between scheduled maintenance events depending on the model. Where the probability rises above a certain value, in this example 50% and stays above that value for a predetermined length of time, in this case 6 days, then a warning signal is generated indicating that the pump concerned should be replaced, generally at the next scheduled maintenance. It should be noted that the threshold value and set time are not predetermined but can be changed and optimised based on the use pattern and failure pattern of the pump(s).

Where the time period for the predicted failure is say 30 days and the maintenance period is longer than this, say 45 days then if this signal is triggered towards the end of the operational period the warning signal may indicate that the pump should be replaced but not until a subsequent maintenance period.

Following replacement of the pump, in some embodiments a service engineer will check the health of the replaced pump and enter information into the supervisor node 20 indicative of the condition of the pump and perhaps its expected lifetime prior to actual failure. In this regard, the pump may have been changed too early and this information may be helpful when optimising the model. Information may also be input as to the cause of failure of the pump where this can be derived.

Thus, by use of the diagnostic model 22 within supervising node 20 an accurate prediction of failure of the pump at some predetermined time in the future can be determined and the pump can then be swapped during a scheduled maintenance event rather than requiring the whole vacuum system to be shut down so that a pump can be changed urgently.

In this embodiment, there is also a connection to a remote or cloud based system 30. In the remote system 30, there is a streaming data management tool 32, which sends data to data storage 34 or to a diagnostic model 33 and which comprises log parser 33a, data storage 33b and a machine learning engine 35. In the remote system 30 a number of data operations take place and these include but are not limited to: management and analysis of streaming data, long term storage in a structure such as a data lake 34, processing via highly proprietary machine learning algorithms 35 to rapidly output a probability of failure, for each pump in the system. The outputs can be sent to the host 25 (e.g. the tool control system and/or the fab process data management system), to a service engineer, or to the end user, in a variety of forms and platforms including mobile devices.

While the operations described above could be performed on a local server in many embodiments they are performed in the cloud, the latter offers distinct advantages in terms of the ability to update the machine learning models and/or software as frequently as needed, while providing a scalable, low cost, standardized architecture within which to work (e.g. Amazon Web Services, IBM Watson, or equivalent).

The remote or cloud based system is configured to stores data from the operation of many pumps of the same type, in a data base or data lake 34. This data includes but is not limited to temperatures, motor speed, heater inputs, regeneration parameters, age, etc. The remote or cloud based system 30 comprises logic 33 for generating and updating a diagnostic model using this data. The cloud based logic 33 accesses data lake 34 which contains data indicative of operating conditions of multiple pumps of a same type during predetermined times including times when they are regenerated, serviced and replaced.

The logic 33 may generate a diagnostic model from this data. In doing this, the logic 33 sample data lake 34 and inputs this to a machine learning algorithm 35 which predicts the probability of failure of the multiple pumps based on the data indicative of their operational condition that is collected. The logic 33 comprises a log parser 33a for receiving the data, data store 33b and the machine learning engine 35. This prediction is compared with the stored actual failure rates of the pumps and parameters of the model are varied until the probabilities and failure rates match to a desired degree. At this point the model is considered to be sufficiently accurate and it is sent for use in the diagnostic circuitry 22 in supervisor node 20.

During operation, the supervisor node 20 may periodically transmit collected data from sensors associated with the pumps detecting operating conditions of the pumps and their regenerations and failures along with information entered by the service engineer regarding the condition of the pumps when swapped and this data may be added to the data lake 34. This process is controlled by streaming data management circuitry 32. Alternatively and/or additionally, the data may be uploaded either manually or via the streaming management circuitry 32 in response to a service engineer noticing that the accuracy of the model has fallen below a certain degree.

The remote logic 33 will on request run the machine learning algorithm 35 again with the additional data to generate an updated and improved model and this can be periodically uploaded to the supervisor node 20 to replace a previously stored model. In this way, the model is continually improved and will adjust to updated conditions.

Although, in some embodiments the newly collected data is simply added to the date lake 34 in other embodiments it may replace some of the data. The data that is replaced may be selected as the oldest data and/or it may be selected as data that is considered least characteristic of that type of pump.

Alternatively and/or additionally the logic 33 may filter the data before entering it into the learning algorithm 35 and during this process may remove any outliers in the data received. In this regard, the operating conditions of the pump may not be characteristic of its usual operation at certain points such as immediately before or after regeneration and thus, such data may be filtered out of the data added to the machine learning algorithm 35.

Figure 2:
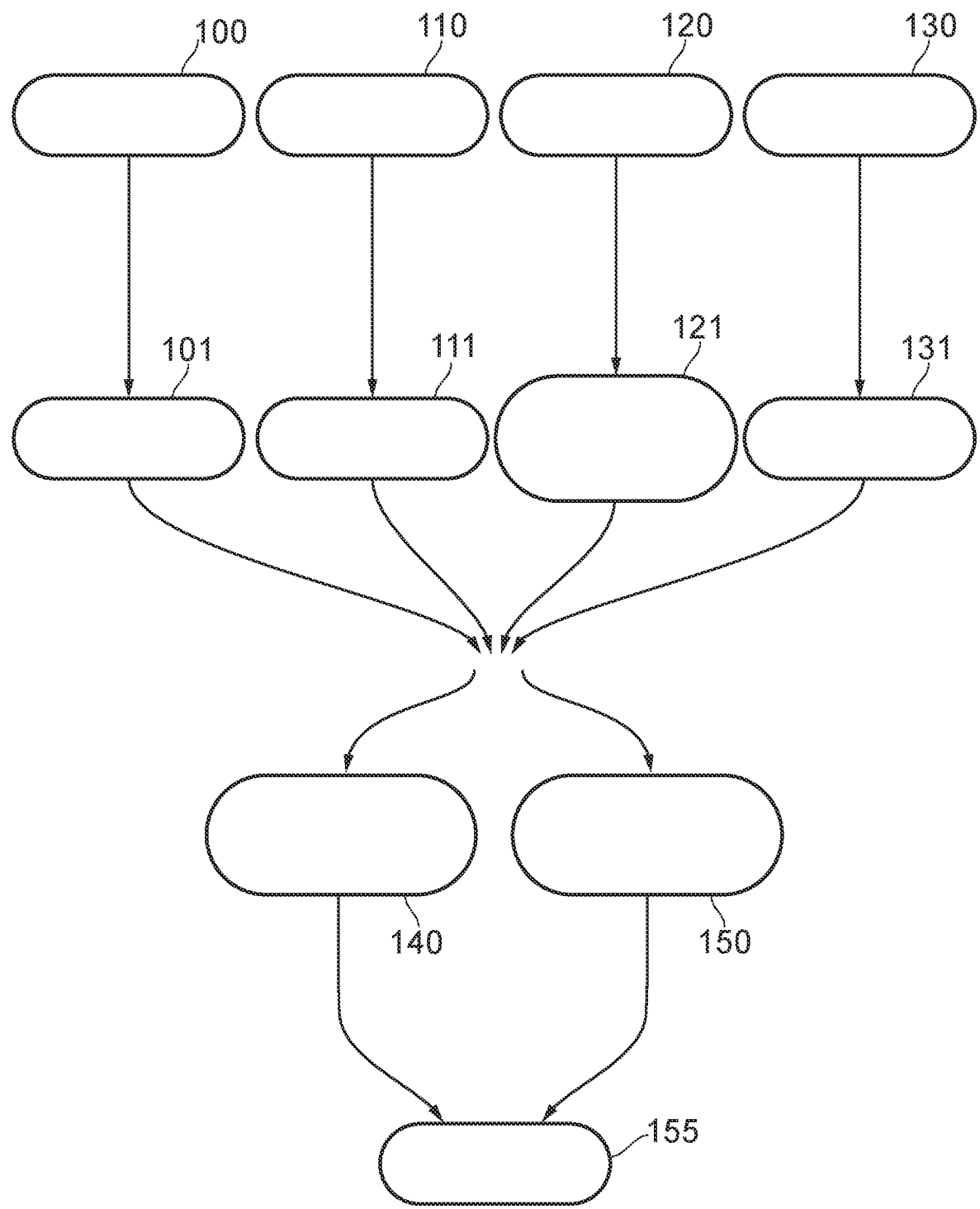
FIG. 2 schematically illustrates the generation of a diagnostic model.

FIG. 2 schematically shows how the diagnostic or predictive model 155 is formed from the data collected from different pumps. The data input into the machine learning algorithm for building the model includes initial pump data 100 which is data related to the particular pump and may include: Serial Number of Pump, Part Number of Pump, The Model of the Pump, If the pump has been swapped out/Removed, Date/Time when Pump was installed and running, The Date/Time of the last pump data record, The Elapsed time hours for the pump, The initial hours of the pump when installed, The Fab at which the pump is installed at, The Name of the tool the pump is installed on, The Manufacturer of the Tool, The type of Tool and The Tool Station Name, and whether or not the pump is marked as refurbished.

In addition an initial pump log 110 indicative of the operation of the pump is input into the machine learning algorithm and may include Weighted Average of the 1st Stage Temperature for the last 10, 30, 60 days, Weighted Average of the 2nd Stage Temperature for the last 10, 30, 60 days; Weighted Average of the RPM for the last 10, 30, 60 days; The maximum value of 1st Stage Temperature; The maximum value of 2nd Stage Temperature; The maximum value of RPM Initial pumps' manufacturing tests 120 may also be input and may include the counted pass/fails of the pump, and the aggregated statistics of the passes. Regeneration data 130 may also be entered and may include: Regeneration Step the pump is in; 1st Stage Temperature; 2nd Stage Temperature; Motor Status, Purge Valve Status; Rough Valve Status; Heater 1 Status; Heater 2 Status; Heater 1 Percent On; Heater 2 Percent On; Motor RPM; Elapsed Hours of pump; Hours since last fast regeneration; Hours since last full regeneration; Date of realtime record; Time in hours it took to regen; The pump hours when the regen started; Date/Time regeneration started; Date/Time regeneration ended; The 1st Stage Temperature at the end of regen; The 2nd Stage Temperature at the end of regen; The Base pressure setting for the regen; The Rate of Rise limit setting for the regen; The number of Rate of Rise cycles performed; The time it took the pump to rough; The time it took the pump to cooldown; The Time between last full regen when the pump started regen; Weighted Average of the 1st Stage Temperature for the last 10, 30, 60 days, Weighted Average of the 2nd Stage Temperature for the last 10, 30, 60 days; Weighted Average of the RPM for the last 10, 30, 60 days; The maximum value of 1st Stage Temperature; The maximum value of 2nd Stage Temperature; The maximum value of RPM. This regeneration data may be checked for missed data and in some cases reduced to standard regeneration values to generate aggregated regeneration data 131.

At the start of the process for building the original diagnostic model using machine learning techniques, pump data such as that outlined above is collected from several different sources. This data includes operational pump data collected from sensors associated with the pumps, and includes data for pumps that have worked for more than 300 hours. A pump log indicating how the data varies with time is also collected, as is data from tests made on the pumps at manufacture, and data collected during regeneration of the pumps. This data is then filtered to remove unneeded attributes, outliers and various conditions where the data is deemed not relevant or required or which is considered uncharacteristic of the pump's operation in general and from this aggregated pump data 101, aggregated pump logs 111, aggregated manufacturing tests 121 and aggregated regeneration data 131 is provided.

This data is then processed to remove the last two months' data for non-swapped pumps, and data immediately preceding (preceding 2 hours) and immediately following regeneration (following 4 hours).

The collected data is then split into training data 140 that in this example comprises data from 300 swapped pumps and 100 non-swapped pumps and prediction data 150 that comprises data from 39 swapped and 9 non-swapped pumps, This data is used in the generation of a predictive model 155.

The training data 140 is used in features generation; to define the machine learning algorithms; and to train data using the model. The prediction data 150 is used to apply machine learning algorithms.

From these processes a predictive model 155 is generated.

In summary the collected training data 140 is entered into the machine learning algorithm and is used as training data to generate a diagnostic model for predicting failure of the pumps from the data collected from the sensors. By comparing the values generated from the training data 140 with actual data, a model is built and when the two are deemed aligned the model is output for use in a vacuum system.

There are many different types of machine learning algorithms which can be used. Indeed the training data 140 may be input to a number of different models and the one that provides the diagnostic model with the most accurate predictions selected. In this regard, it is an iterative process and the degree of accuracy of the model can be determined by comparing predicted failure rates with the actual failure rates of the data. As noted previously a predicted failure of a pump is one where it requires some servicing and thus, the actual "failures", may relate to actual circumstances where a pump's operation is outside of required limits, or it may simply be a point at which the pump is swapped so that it can be serviced for example.

Figure 3:
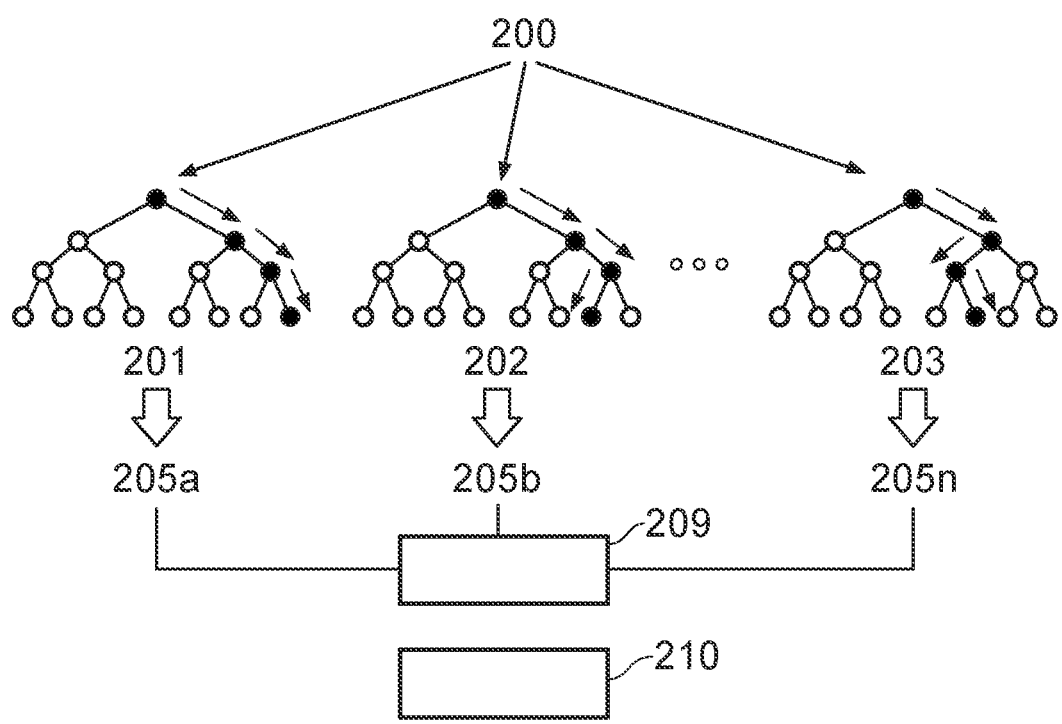
FIG. 3 schematically illustrates a machine learning algorithm.

FIG. 3 shows an example of one machine learning algorithm which was found to generate a particularly successful diagnostic model when used with this data. This is the random forest simplified machine learning algorithm where in this case multiple forests with several hundred trees were used with each tree making a prediction and each forest coming up with a probability. The minimum probability of failure from the multiple forests was then determined and used to create a warning which was selected as being triggered when the probability reached or exceeded 0.5. Where such a probability lasted for more than six days in a row, replacement at the next preventive maintenance point was advised.

So starting from instance 200 and using the random forest technique one arrives at tree-1 201, tree-2 202, through to tree-n 20n. From this different classes 205a, 205b, 205n are derived and by majority voting 209 a final class 210 is arrived at.

Figure 4:
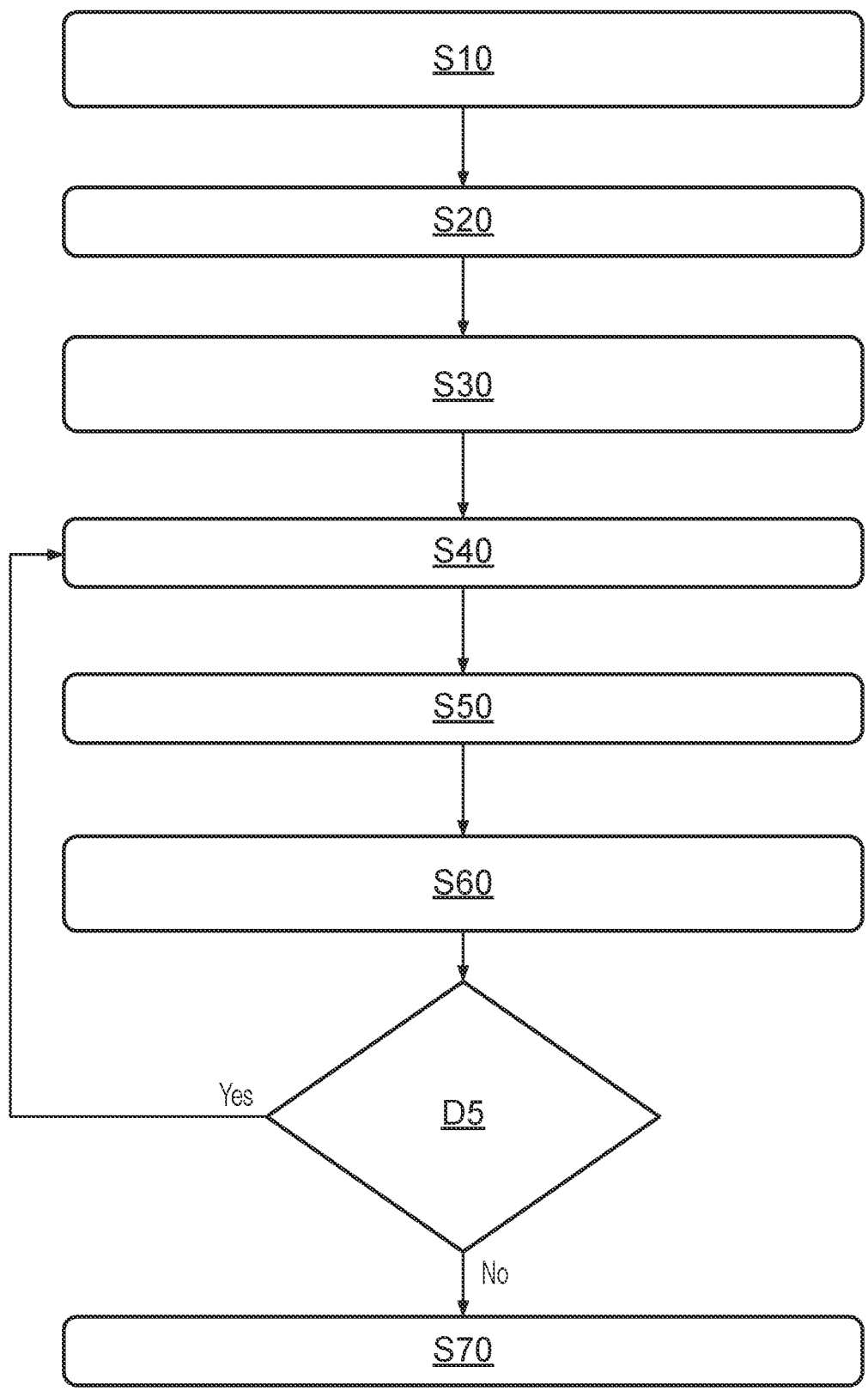
FIG. 4 schematically illustrates a flow diagram illustrating steps in a method for generating a diagnostic model according to an embodiment.

FIG. 4 shows a flow diagram illustrating steps in a method for generating or updating the diagnostic model of an embodiment. Initially at step S10: data indicative of the operating conditions of a plurality of pumps is input to a machine learning algorithm. This data may be data from a database such as the data lake 34 of FIG. 1. At step S20, the probability of the failure of each of the pumps is derived from the machine learning algorithm and this is compared with actual failure at step S30 including regeneration and/or servicing data for these pumps. In this regard a pump may not fail as such, but it may be serviced or regenerated to avoid it failing and thus, this data is used. An accuracy of the predicted probability is then determined.

The parameters which may include weighting factors and/or the actual algorithm of the model are then changed at step S40 and an updated probability of failure is determined at step S50. The accuracy of the updated probability is then determined by comparing the generated probability with the actual failure and if it is determined at D5 than it is more accurate than the previous measure (yes) the parameters are changed in the same direction again at S40 and a recalculation is performed. When the updated measure is less accurate (no at D5) then the previous values are used to generate a diagnostic model at step S70. This is a simplistic outline of a complex procedure and as would be understood the step of varying the parameters may be done in several steps each involving a subset of the parameters and/or calculations performed, and/or the variations may be done initially in larger steps and then in smaller steps when a minimum value from the larger steps has been found. In any case the method is iterative and when no more improvement is felt or a desired accuracy is reached then the diagnostic model may be generated from these parameters.

Figure 5:
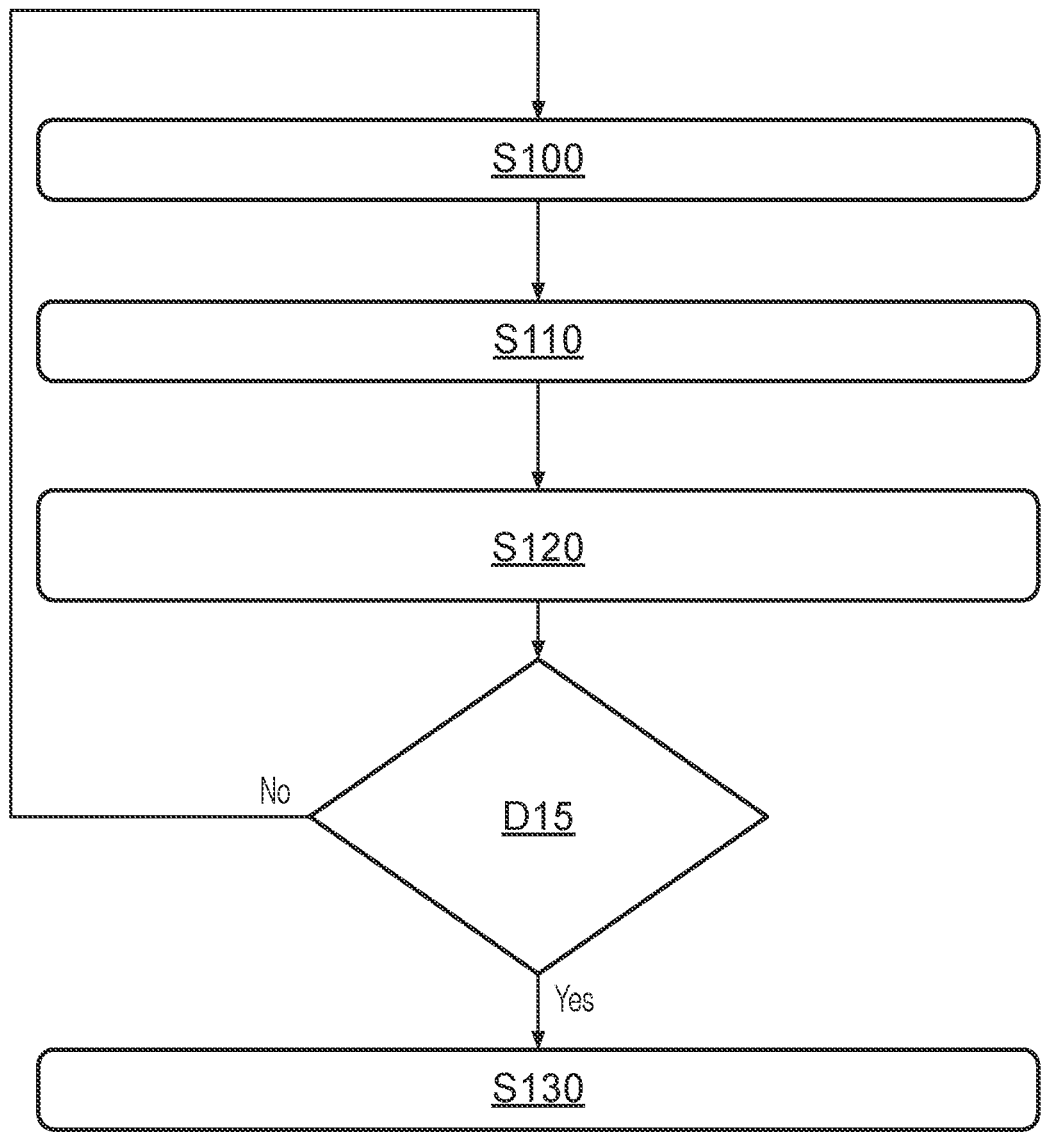
FIG. 5 schematically illustrates a flow diagram illustrating steps in a method for predicting a failure of a vacuum pump according to an embodiment.

FIG. 5 shows a flow diagram illustrating a method of predicting the failure of a pump according to an embodiment. This includes the steps of sampling signals indicative of the operating condition of the pump from sensors associated with the pump at step S100. Inputting the signals to a diagnostic model at step S110, determining the probability of the pump failing from this model at step S120 and determining at D15 whether this is above a predetermined value and indeed stays above this value for a predetermined time and if so (yes) then outputting a warning indicating that the pumps should be serviced or replaced at step S130. If the probability does not rise above the threshold value then no warning is output.

FIG. 6 schematically shows the value of this approach for the example of a single pump. The variation in several monitored values are shown, that is T1, temperature of the first stage of the pump, T2, temperature of the second stage of the pump, the speed of the pump motor 300, the value of T1 at the end of a regeneration cycle T1end and the value of T2 at the end of a regeneration cycle T2end, the time to cool down to the required temperature 310, and from these values the probability of failure 330 is detected using the diagnostic model of an embodiment. This probability can be trended and monitored and when it crosses certain thresholds warnings/alarms to swap the pump can be generated.

Figure 6A:
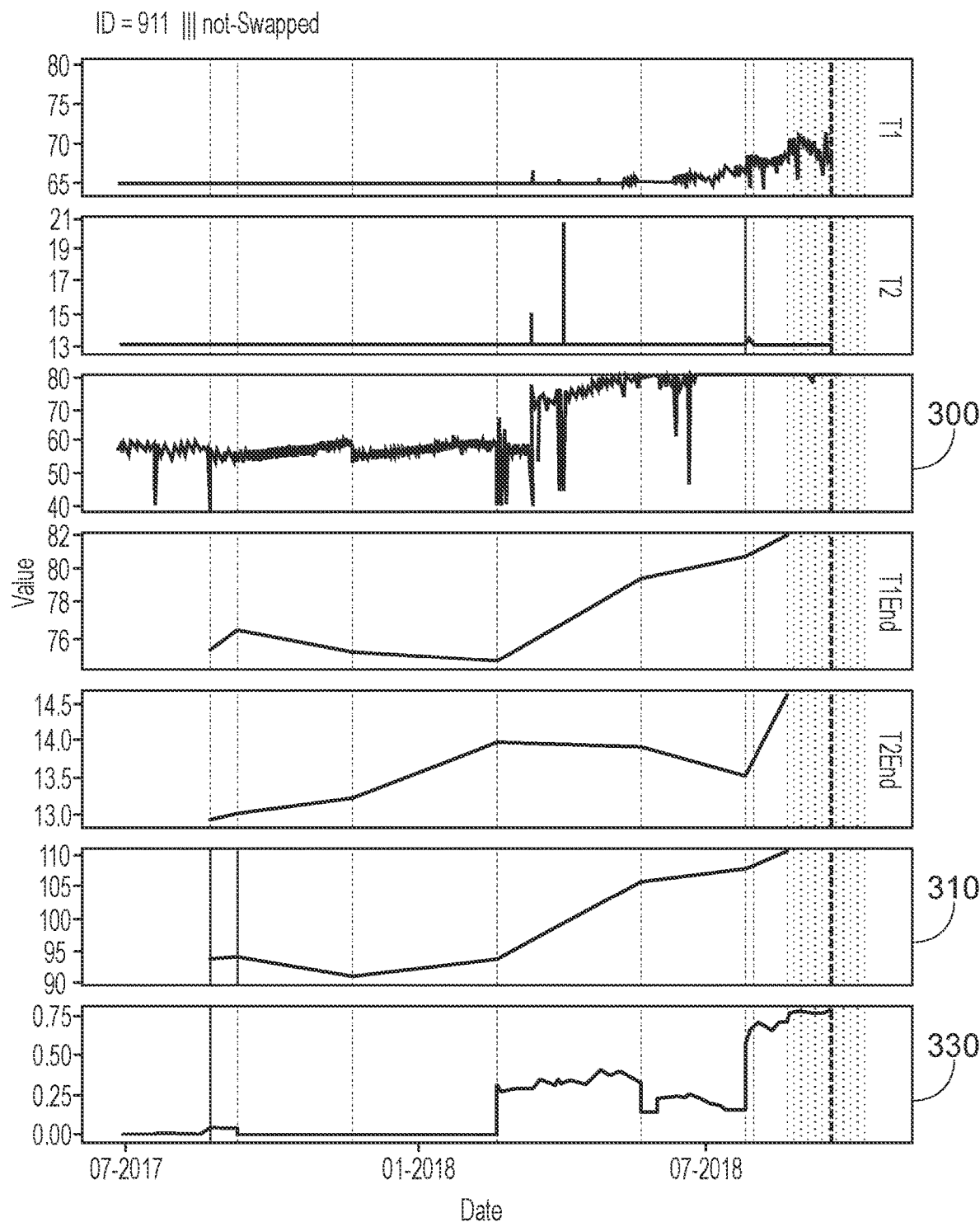
FIGS. 6A and 6B schematically illustrates how various sensed parameters change during operation of a pump.
Figure 6B:
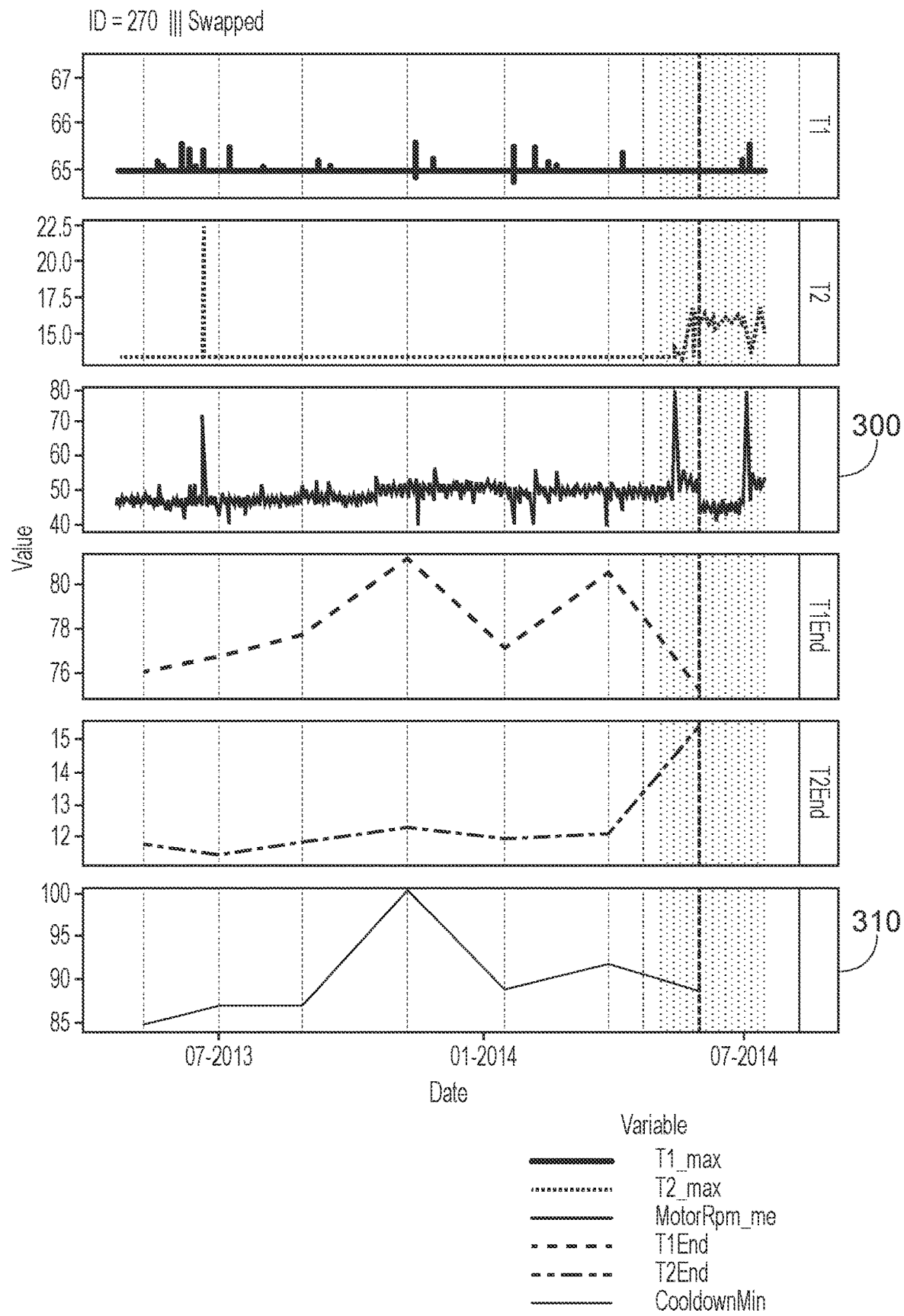

In FIG. 6A the beginning of the red zone indicates where it is predicted a pump might fail and should be changed, and in this case the pump is not swapped and FIG. 6A shows how the values change thereafter. FIG. 6B show an alternative embodiment where the pump is swapped at the point it is predicted that it might fail.

Embodiments may be used in conjunction with a conventional servicing provision, which monitors pump performance over time and provides servicing to the pump. In a conventional servicing provision, data is collected from a pump. This data may include but is not limited to temperatures, motor speed, heater inputs, regeneration parameters, age, etc. This data is collected and parsed by an embedded system. Data summaries are packaged, transmitted by e-mail every predetermined time period, and stored on a separate server. The data can be viewed in either raw form, or visually as a set of graphs. The service engineers use the latter to identify trends in key control parameters such as T1, T2, and pump speed in rpm. They then combine this intelligence with their prior knowledge of the installation and use this to manage the end user's pump fleet with respect to recommending pump changeouts or other corrective actions. In other words, such a system provides insight into pump performance but requires active intervention by an experienced service engineer who can recognize trends and patterns.

The proposed solution is built on the same fundamental data, but instead uses advanced, highly proprietary machine learning algorithms to compute the likelihood of a particular pump failing in some fixed interval (e.g. 30, 45, 60 days). The algorithms utilize one or more machine learning (ML) methods (including but not limited to: random forest, neural networks, principal component analysis, etc.). The ML algorithms are built and "trained" on this database, in which swap events from the past have been clearly identified, and then validated on another subset of the database.

The major advantages of this approach include:
- Ability to predict performance degradation of a pump far ahead of when it would be reflected in normal indicators such as T1, T2, and pump speed data as it relies on "features", or transformed variables, that represent numerous other facets of pump operation.
- Avoiding or at least reducing the (often incorrect) reliance upon stringent control limits for T1 and T2, which can lead to premature changeout of the pump by the end user
- Creating a platform upon which to incorporate additional sensors or diagnostic information that can improve the model prediction accuracy and/or lead time
- The probability function can be used to provide guidance on proactively changing out pumps, allowing (in principle) elimination or at least reduction of unscheduled downtime if the end user follows guidance Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A vacuum system, comprising:
   at least one cryopump;
   a plurality of sensors associated with said at least one cryopump each of said plurality of sensors being configured to sense an operating condition of said at least one cryopump;
   diagnostic circuitry configured to receive signals sampled from at least some of said plurality of sensors and to receive a step of regeneration when the sampled signals were sampled from the plurality of sensors, said diagnostic circuitry comprising a diagnostic model of said cryopump, said diagnostic model being derived from historical data of a plurality of cryopumps of a same type operating over a plurality of regeneration and servicing time periods and being configured to relate values of said sampled signals from said at least some sensors and the steps of regeneration when the sampled signals were sampled to a probability of said pump failing within a predetermined time, said diagnostic circuitry being configured to apply said sampled signals and said step of regeneration when said sampled signals were sampled to said diagnostic model and to determine said probability of said at least one cryopump failing within said predetermined time from an output of said model.

2. The vacuum system according to claim 1, wherein at least some of said plurality of signals include at least some of: a first temperature of a first stage of said cryopump, a second temperature of a second stage of said cryopump, a time since a last regeneration, a speed of a motor of said cryopump, inputs to heater circuitry, and a time for said cryopump to cool down to said first temperature.

3. The vacuum system according to claim 1, said vacuum system comprising a plurality of cryopumps, said diagnostic circuitry being configured to receive signals from each of said plurality of cryopumps and to determine a probability of each of said cryopumps failing.

4. The vacuum system according to claim 1, wherein said diagnostic circuitry is responsive to detecting a probability of said at least one cryopump failing being above a predetermined threshold value for a set time to output a warning indicating said pump should be replaced at a next scheduled preventive maintenance.

5. The vacuum system according to claim 1, said vacuum system comprising an input for receiving signals from a remote diagnostic system and an output for outputting signals to said remote diagnostic system.

6. The vacuum system according to claim 5, said vacuum system being configured to periodically output data collected from at least some of said sensors along with data indicative of maintenance performed on said at least one cryopump to said remote diagnostic system.

7. The vacuum system according to claim 6, said vacuum system comprising an input for receiving data from a service engineer indicative of a condition of a pump that is replaced during said maintenance period, said vacuum system being configured to output said data indicative of said condition of said replaced pump as part of said periodically output data.

8. The vacuum system according to claim 1, said vacuum system comprising an input configured to periodically receive updates to said diagnostic model.

9. The vacuum system according to claim 8, said vacuum system comprising an input configured to periodically receive said updates to said diagnostic model from said remote diagnostic system.

10. A method of monitoring a vacuum system, said vacuum system comprising at least one cryopump, said method comprising:
   sampling a plurality of signals indicative of operating conditions of said at least one cryopump from sensors associated with said cryopump:
   inputting at least some of said signals and a step of regeneration when said signals were sampled to a diagnostic model of said cryopump, said diagnostic model being derived from historical data of a plurality of cryopumps of a same type operating over a plurality of time periods, at least some of which include at least one of regeneration, servicing and failure of said pump, said diagnostic model relating signals to a probability of said pump failing;

determining from an output of said model a probability of said at least one cryopump failing.

11. A method of generating a diagnostic model for a type of cryopump, said method comprising:
inputting into a current version of the diagnostic model data collected from sensing operating conditions of a plurality of cryopumps of said type from a database storing said sensed operating conditions of said plurality of cryopumps sampled over a plurality of time periods at least some of the time periods including at least one of regeneration, servicing and failure, to generate a plurality of probabilities of said cryopumps failing within a certain time;
determining an accuracy of the plurality of probabilities and altering the current version of the diagnostic model to improve the accuracy of the plurality of probabilities; and
repeating said steps until the accuracy reaches a desired value; and
outputting the version of the diagnostic model that provided said desired value of accuracy.

12. The method according to claim 11, wherein prior to inputting said data into said current version of the diagnostic model said signals are filtered to remove outlying data.

13. The method according to claim 11, wherein prior to inputting said received signals into said current version of the diagnostic model said signals are filtered to remove signals sampled a predetermined time before and after a regeneration of said cryopumps.

14. The method according to claim 11, further comprising:
while using the diagnostic model, receiving additional data for an additional cryopump of said type;
adding said additional data to said database;
inputting into a current version of the diagnostic model data in said database including said additional data to generate a plurality of probabilities of said plurality of cryopumps and said additional cryopump failing within a certain time;
determining an accuracy of the plurality of probabilities and altering the current version of the diagnostic model to improve the accuracy of the plurality of probabilities; and
repeating the steps of generating the plurality of probabilities of said plurality of cryopumps and said additional cryopump failing, determining an accuracy of the plurality of probabilities and altering the current version of the diagnostic model to improve the accuracy of the plurality of probabilities until the accuracy reaches a desired value; and
generating the version of the diagnostic model that provided said desired value of accuracy.

15. The method according to claim 14, further comprising receiving data indicative of a condition of a pump replaced following said diagnostic model indicating said pump would fail within a predetermined time, said data being input to said current version of the diagnostic model.

* * * * *